United States Patent [19]

Lui

[11] 4,268,124
[45] May 19, 1981

[54] OPTICAL REFLECTOR HAVING A NICKEL-IRON ALLOY REFLECTING SURFACE

[75] Inventor: Kenneth Lui, Fountain Valley, Calif.

[73] Assignee: TRW Inc., Redondo Beach, Calif.

[21] Appl. No.: 83,184

[22] Filed: Oct. 9, 1979

Related U.S. Application Data

[60] Division of Ser. No. 917,779, Jun. 21, 1978, Pat. No. 4,231,847, which is a continuation-in-part of Ser. No. 775,310, Mar. 7, 1977, abandoned.

[51] Int. Cl.³ .......................... G02B 7/18; G02B 5/10
[52] U.S. Cl. .................................................. 350/310
[58] Field of Search .............................. 350/310; 204/7

[56] References Cited

FOREIGN PATENT DOCUMENTS 2215631  8/1974  France ................................ 350/310

Primary Examiner—Jon W. Henry
Attorney, Agent, or Firm—John J. Connors; Donald R. Nyhagen

[57] ABSTRACT

There is disclosed an optical mirror consisting essentially of an electrodeposited nickel-iron face sheet having a relatively low temperature coefficient of expansion on a lightweight graphite backup substrate having approximately the same temperature coefficient of expansion as the electrodeposited nickel-iron face sheet.

1 Claim, 1 Drawing Figure

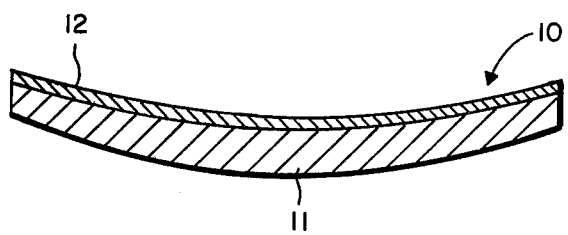

OPTICAL REFLECTOR HAVING A NICKEL-IRON ALLOY REFLECTING SURFACE

CROSS-REFERENCE TO RELATED APPLICATIONS

This application is a division of application Ser. No. 917,779, filed June 21, 1978, now U.S. Pat. No. 4,231,847 which is a continuation-in-part of U.S. Pat. application Ser. No. 775,310, filed Mar. 7, 1977, now abandoned.

BACKGROUND OF THE INVENTION

It is oftentimes essential in a variety of areas, for example the aerospace field, to have articles of manufacture and articles having a coating thereon which have low temperature expansion coefficients (TEC). Such articles have critical dimensions and for the satisfactory function of such articles it is necessary that such critical dimensions do not change during environmental changes such as temperature. Such articles include optical reflectors, microwave filters, feedhorns, wave guides and the like.

One known method of fabricating such articles involves machining them from low thermal expansion coefficient nickel-iron alloys such as INVAR (an alloy or iron and nickel containing about 36%, by weight of nickel and 64%, by weight, of iron). While this machining technique is time-consuming, costly, and ill-suited to mass production, it has been, and still is being, utilized rather than the more efficient and cost-effective technique of electroforming owing to the lack of a workable and practical method of electrodepositing INVAR and other low temperature coefficient alloys to any substantial thickness. In this regard, it should be noted that alloys of nickel and iron have been successfully electrodeposited, but only in the form of thin nickel and iron films for magnetic memory applications. Attempts to electrodeposit such alloys to thicknesses required for electroforming have been unsuccessful owing to the inability to control the proportions of the alloy constituents in the thicker electrodepositions or electroformed articles.

SUMMARY OF THE INVENTION

It is an object of the present invention to disclose and provide an optical mirror having an optically reflective surface comprising an iron and nickel alloy layer or facesheet mounted on a substrate and formed by an electrodeposition process which utilizes an electrolyte solution consisting essentially of nickel chloride and ferrous sulfate and an anode composed of nickel and iron the weight percentage of nickel and iron in the anode substantially corresponding to the weight percentage of nickel and iron in the electrodeposit.

It is a further object of the present invention is to disclose and provide an optical mirror having an optically reflective layer composed of a nickel-iron alloy which has a low temperature expansion coefficient of less than about $5 \times 10^{-6}$ in/in/°F. and a supporting substrate composed of graphite epoxy composite having substantially the same temperature expansion coefficient as the nickel-iron alloy, whereby there is no resulting distortion to the optical mirror due to ambient temperature changes.

other and further objects of the present invention will become apparent from the following detailed description wherein all parts and percentages are by weight, unless expressly stated otherwise, and all temperatures are in degrees fahrenheit unless expressly stated otherwise. It should be noted that whenever in the specification and claims the temperature expansion coefficient is referred to, it is to be understood that said temperature expansion coefficient is in the following units: in/in/°F.

BRIEF DESCRIPTION OF THE DRAWING

The drawing is a cross-sectional view showing my optical mirror.

DESCRIPTION OF THE PREFERRED EMBODIMENT

The present invention, in general, accomplishes the foregoing objects by providing a specially balanced electrolyte solution wherein the nickel and iron ions are electroplated onto a suitable optical mandrel under suitably controlled conditions. The electrodeposited or electroformed nickel and iron is an alloy (i.e., a substantially homogeneous admixture) containing from about 80% to 55%, by weight, of iron and 20% to 45%, by weight, of nickel. Preferably, the present invention provides an electrodeposit of an alloy of nickel and iron wherein the amount of iron ranges from 60% to 70%, by weight, and the amount of nickel ranges from 40% to 30%, by weight. In other words, the present invention provides for an electrodeposit of an alloy of iron and nickel approaching the percentages of invar.

The alloy electrodeposited by the present invention has a temperature expansion coefficient of less than $5 \times 10^{-6}$ in/in/°F., preferably less than $4 \times 10^{-6}$ in/in/°F. Additionally, the electrodeposited (or the electroformed) reflecting layer is not highly stressed or brittle, and has little or no surface cracks. One of the prime reasons for the fact that the electrodeposited iron and nickel alloy contains substantially no surface cracks and is not brittle is because the iron-nickel alloy contains substantially no iron oxide. This is accomplished by the method of the present invention by excluding free oxygen during the electrodepositing or electroforming process, i.e., free oxygen is excluded while the iron-nickel alloy is being electrodeposited on a suitable substrate. Additionally, while electric current is being passed through the electrolyte solution, the electrolytic solution should be agitated. Exclusion of oxygen and the agitation is preferably accomplished by bubbling an inert gas through and in contact with the electrolyte solution. The preferred inert gas is nitrogen. It is also preferred if the nitrogen is bubbled through the solution by providing means at the bottom of the tank so that the nitrogen enters the bottom of the tank and is allowed to bubble through and in contact with the electrolyte solution. In addition, the tank containing the aqueous electrolyte solution is not completely filled with the solution and a closure is provided on top of the tank to prevent the entry of atmospheric air into the tank in contact with the electrolyte solution. Because the electrolyte solution does not completely fill the tank, there remains a gap which, when nitrogen is bubbled through the electrolyte solution, is filled with nitrogen thereby excluding air from said gap. Such means for providing nitrogen at the bottom of the tank may include one or more pipes having fine holes or slits therein for passage of nitrogen therethrough. The nitrogen is under sufficient amount of pressure so that it will pass through the pipe and through the slits or holes in the pipe to bubble through the electrolyte solution.

Because of the bubbling action of the inert gas (e.g. nitrogen) the passage of nitrogen through the solution not only excludes the presence of free oxygen, but also agitates the solution. Therefore, it is desirable in practicing the method of the present invention to bubble the inert gas through the electrolyte solution while current is passed through the electrolyte solution thereby depositing the iron-nickel alloy onto a suitable substrate.

As has been noted, the present invention provides an optical mirror with a nickel-iron alloy reflecting layer which has a low temperature expansion coefficient and is formed by electrodepositing or electroforming a layer of nickel-iron alloy on an optical mandrel of suitable size and shape. Such an article is different than those articles formed by thermally forming an iron-nickel alloy into an article. During the thermally forming method, the alloy contains iron in the gamma form. However, in the present invention, since the electroforming process is done at relatively low temperatures, the iron is not in the gamma form, but primarily in the alpha form.

In addition to exclusion of nitrogen from the electrolyte solution, another relatively critical parameter of the present invention is the pH of the electrolyte solution. Preferably, the pH of the electrolyte solution is maintained at less than 3 and preferably from 1 to 3, for example 2. The pH of the electrolyte solution may be lowered by the addition of any suitable material mineral acid such as hydrochloric or sulfuric.

The temperature of the electrolyte solution should be maintained between about 175° F. and the boiling point of the aqueous electrolyte solution. Preferably, the temperature is maintained between about 190° F. and 210° F., and more preferably, between 190° F. and 200° F.

The composition of the aqueous electrolyte solutions used in electroforming the reflecting layer of the present mirror is critical and, in general, such aqueous solutions are composed primarily of ferrous sulfate and nickel chloride, as well as water. Since the pH of the electrolytic solutions must be relatively low, such solutions may also contain an acid such as suitable mineral acid, preferably, hydrochloric acid. The reason that the aqueous electrolyte solution must contain nickel chloride and ferrous sulfate is, inter alia, because the solution must electrochemically corrode, at a substantially 100% efficiency, the nickel-iron anode which is also used in the method of the present invention. Such corrosion of the anode is necessary in order to maintain a relatively constant concentration of the ferrous ions and nickel ions in the electrolyte solution during the entire time of the electrodepositing method of the present invention.

Other conventional compounds may also be present in the electrolyte solution. For example, various buffers such as sodium acetate, boric acid, etc., may be present in varying amounts, for example, from 10 to 100 grams per liter and preferably from 20 to 50 grams per liter, and more preferably, from 20 to 40 grams per liter. Other compounds which may be present are iron complexing compounds such as glutaric acid as well as amine containing complexing agents such as ethylenediamene-tetracetic acid.

Other compounds which may be present in the electrolyte solution are brightening agents such as saccharine.

The amount of nickel ions and iron ions in the solution are such that the electrodeposited or electroformed reflecting layer contains from about 55% to 75%, by weight, of iron, and preferably, from 60% to 70%, by weight, of iron, and from 45% to 25%, by weight, of nickel, and preferably, from 30% to 40%, by weight, of nickel. In general, the amount of iron ions (ferrous irons) in the electrolyte solution will range from 85 weight percent to 55 weight percent, based on the total weight of the iron ions and nickel ions present in said aqueous electrolyte solution. The amount of nickel ions present will, in general, vary from 15 weight percent to 45 weight percent, again based on the total weight of the iron ions and nickel ions present in the aqueous electrolyte solution. It is preferred if the amount of iron ions present in the aqueous electrolyte solution are between about 60% to 80%, by weight, and the nickel ions present being from 40% to 20%, by weight.

The concentrations of both the nickel ions and iron ions in the solution determine but do not necessarily equal the proportions of nickel and iron in the electrodeposited reflecting layer. The concentration of iron should range from about 0.1 molar to 2 molar and preferably between about 0.5 molar and 1.5 molar, and the concentration of nickel ions present should range from about 0.02 molar to about 1.5 molar and, preferably, from about 0.1 molar to about 1 or 1.2 molar, depending upon the percentages of nickel and iron desired in the alloy to be deposited.

The anode used in the present invention consists essentially of iron and nickel alloy, the amount of iron and nickel in the alloy being substantially the same weight percent as the amount of nickel and iron in the electrodeposited alloy. A most preferred anode will contain about 65 weight percent iron and 36 weight percent nickel.

The cathode (i.e., the substrate) used in the present invention is not critical, providing it is electrically conductive. When electroforming nickel-iron alloy, the preferred metal is aluminum since this is very easily etched from the nickel-iron alloy by utilizing, for example, a caustic such as sodium hydroxide which will etch the aluminum from the nickel-iron alloy but will not adversely affect the nickel-iron alloy.

The current used in the present invention is not critical and can vary greatly. For example, I have successfully used a direct current varying from 20 amps per square foot to 50 amps per square foot. Similarly, the area of the anode to cathode can vary greatly, but I have used successfully an anode-cathode ratio of 1:2 and less. That is to say that the cathode has twice the area as the anode but this ratio is not critical and may vary.

It is perhaps appropriate to mention here that in addition to the foregoing advantages mentioned here for the electrodeposited nickel-iron alloy, another advantage is that it can be electrodeposited uniformly very thick, for example, in excess of 0.05 inches. In general, however, the thicknesses vary from 0.02 inches or slightly less which is satisfactory for electroforming the reflecting layer of the present mirror.

In the following preferred examplary embodiment, a nickel-iron alloy containing approximately 70% iron and 30% nickel is electroplated on an aluminum form, the electrodeposited nickel-iron alloy having a temperature expansion coefficient of about $4.3 \times 10^{-6}$. The bath formulation and operating conditions are shown in the following Table 1.

TABLE 1

| Bath Formulation | grams/liter | Operation Condition |
|---|---|---|
| $FeSO_4 \cdot 7 H_2O$ | 255 grams | pH (with HCl) 2.0 |

TABLE 1-continued

| Bath Formulation | grams/liter | Operation Condition |
|---|---|---|
| NiCl$_2$ . 6 H$_2$O | 60 grams | Temperature: 195 ± 3° F. Agitation: inert gas bubbler |
| Boric Acid | 30 grams | Anode to Cathode Ratio: 2 minimum |
| Saccharin | 2 grams | |
| Water to one liter volume | | Anode: 36% Ni, 64% Fe |

In the following preferred exemplary embodiment, a nickel-iron alloy was electrodeposited on an aluminum form and thereafter the aluminum was chemically etched with sodium hydroxide from the nickel-iron alloy. The nickel-iron alloy contained approximately 65 weight percent iron and 35 weight percent nickel and had a temperature expansion coefficient of less than $4 \times 10^{-6}$. The operating conditions are shown below in Table 2.

TABLE 2

| Bath Formulation | grams/liter | Operation Condition |
|---|---|---|
| FeSO$_4$ . 7 H$_2$O | 230.5 grams | pH (with HCl) 2.0 Temperature: 195 ± 3° F. |
| NiCl$_2$ . 6 H$_2$O | 80.6 grams | Agitation: inert gas bubbler |
| Boric Acid | 30 grams | Anode to Cathode ratio: 2 minimum |
| Saccharin | 2 grams | |
| Water to one liter volume | | Anode: 36% Ni, 64% Fe |

As noted, the alloy was electrodeposited on aluminum and the aluminum was chemically etched from the nickel-iron alloy with sodium hydroxide, thereby leaving an electroformed sheet of about 0.02 inches thickness, said sheet being free of embrittlement and cracks because of the absence of iron oxide and the influence of ferric iron. In both of the preferred exemplary embodiments, the use of an inert gas (in both instances, nitrogen) for agitation rather than air or mechanical stirring, excluded the formation of ferric oxide which would have led to a cracked and/or embrittled alloy. In addition, the nickel chloride and iron sulfate bath corroded the nickel-iron anode at almost 100% current efficiency so that the proper nickel-iron concentration was maintained throughout the plating solution. In both exemplary embodiments, the current was approximately 30 amps per square foot and was supplied by a direct current source.

Referring now to the drawing which shows, in cross section, an optical mirror 10 in accordance with my invention. The optical mirror consists of a nickel-iron layer or face sheet 12 which has a smooth-mirror surface. This nickel-iron layer of face sheet has a temperature expansion coefficient of less than $5 \times 10^{-6}$ and preferably less than $4 \times 10^{-6}$ and was made using the procedure set forth in Table B 1 wherein the form used was an optical mandrel. The thickness of the electrodeposited layer face sheet was about 0.05 inches.

The thus formed face was removed from the mandrel and joined to a lightweight composite back-up substrate 11 which was a graphite epoxy composite, the surface of which was impregnated with epoxy resin. The substrate 11 had substantially the same temperature coefficient of expansion as face sheet 12.

After face sheet 12 was joined to substrate 11 the epoxy resin was cured in a conventional manner to provide a strong bond between the face sheet 12 and substrate 11.

The composite optical mirror 10 will have no distortion due to changes in temperature since the face sheet 12 and lightweight graphite substrate 11 have substantially the same temperature expansion coefficient. Insofar as I am aware, there was heretofore no way to accomplish this matching of temperature expansion coefficients in composite lightweight optical mirrors.

I claim:

1. An optical mirror comprising a face sheet bonded to a lightweight substrate, said face sheet consisting essentially of a substantially homogeneous admixture of nickel and iron having a temperature expansion coefficient of less than about $5 \times 10^{-6}$, said homogeneous admixture containing substantially no iron oxide, and said lightweight substrate consisting essentially of graphite epoxy composite having substantially the same temperature coefficient of expansion as said face sheet.

* * * * *